US007668186B1

(12) United States Patent
Nelson, IV et al.

(10) Patent No.: US 7,668,186 B1
(45) Date of Patent: Feb. 23, 2010

(54) TOKEN ECOSYSTEM FOR BUFFER MANAGEMENT

(75) Inventors: Roscoe Conkling Nelson, IV, Arvada, CO (US); Stacey Secatch, Longmont, CO (US); Thomas E. Fischaber, Golden, CO (US); Tony Viet Nam Le, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 550 days.

(21) Appl. No.: 11/369,338

(22) Filed: Mar. 7, 2006

(51) Int. Cl.
*H04L 12/56* (2006.01)

(52) U.S. Cl. ............................. 370/412; 370/428

(58) Field of Classification Search ............ 370/412, 370/428, 353; 711/1, 52, 206, 163; 709/236; 365/230.05, 189.15
See application file for complete search history.

(56) References Cited

U.S. PATENT DOCUMENTS

| | | | | | |
|---|---|---|---|---|---|
| 4,862,451 | A | * | 8/1989 | Closs et al. | 370/353 |
| 5,535,290 | A | * | 7/1996 | Allen | 382/250 |
| 5,608,396 | A | * | 3/1997 | Cheng et al. | 341/50 |
| 5,815,491 | A | * | 9/1998 | Guibert | 370/233 |
| 5,898,687 | A | * | 4/1999 | Harriman et al. | 370/390 |
| 5,909,553 | A | * | 6/1999 | Campbell et al. | 709/236 |
| 5,918,055 | A | * | 6/1999 | Crawford et al. | 710/240 |
| 5,956,741 | A | * | 9/1999 | Jones | 711/1 |
| 6,072,548 | A | * | 6/2000 | Schoner et al. | 375/240.26 |
| 6,347,348 | B1 | * | 2/2002 | Webber | 710/52 |
| 6,378,030 | B1 | * | 4/2002 | Jones | 711/1 |
| 6,424,658 | B1 | * | 7/2002 | Mathur | 370/429 |
| 6,721,789 | B1 | * | 4/2004 | DeMoney | 709/219 |
| 6,925,014 | B1 | * | 8/2005 | Fischaber et al. | 365/189.15 |
| 6,941,393 | B2 | * | 9/2005 | Secatch | 710/52 |
| 6,950,959 | B2 | * | 9/2005 | Davies et al. | 713/500 |
| 6,986,017 | B2 | * | 1/2006 | Pizel et al. | 711/206 |
| 6,993,663 | B1 | * | 1/2006 | Paya et al. | 711/163 |
| 7,397,808 | B2 | * | 7/2008 | Lee et al. | 370/413 |
| 7,490,221 | B2 | * | 2/2009 | Evans et al. | 712/34 |
| 7,506,298 | B1 | * | 3/2009 | Ingoldby et al. | 716/18 |
| 7,535,789 | B1 | * | 5/2009 | Fischaber et al. | 365/230.05 |

(Continued)

FOREIGN PATENT DOCUMENTS

EP    0276349 A1 *    8/1988

OTHER PUBLICATIONS

Brewer et al., PCI Express Technology, Feb. 2004, Dell, , 6.*

(Continued)

*Primary Examiner*—Salman Ahmed
(74) *Attorney, Agent, or Firm*—Kevin T. Cuenot (57) ABSTRACT

A buffer management system for a data processing system can include a plurality of tokens wherein each token is associated with one of a plurality of buffers, and a plurality of first-in-first-out (FIFO) memories. Each FIFO memory can be associated with a stage of the data processing system and is configured to store at least one of the tokens. The buffer management system also can include control logic configured to determine a state of one or more selected buffers and transfer the token associated with the selected buffer from a source FIFO memory to a target FIFO memory. The target FIFO memory can be selected according to the state of the selected buffer.

20 Claims, 4 Drawing Sheets

U.S. PATENT DOCUMENTS

| | | | | |
|---|---|---|---|---|
| 7,555,576 | B2* | 6/2009 | Leijten | 710/35 |
| 7,565,465 | B2* | 7/2009 | Secatch | 710/52 |
| 2004/0138787 | A1* | 7/2004 | Ransom et al. | 700/295 |
| 2007/0083491 | A1* | 4/2007 | Walmsley et al. | 707/3 |

OTHER PUBLICATIONS

Token transactions: managing fine-grained migration of data; Symposium on Principles of Database Systems archive Proceedings of the ninth ACM SIGACT-SIGMOD-SIGART symposium on Principles of database systems table of contents Nashville, Tennessee, United States; pp. 344-356; Year of Publication: 1990.*

Xilinx, Inc.; "PCI Express Endpoint Cores v3.1"; DS506; Product Specification; Jan. 18, 2006; available from www.xilinx.com; pp. 1-19.

* cited by examiner

TOKEN ECOSYSTEM FOR BUFFER MANAGEMENT

BACKGROUND

1. Field of the Invention

The present invention relates to the field of integrated circuits and, more particularly, to a buffer management system for use with such devices.

2. Description of the Related Art

Data processing systems, such as communication systems, typically must perform functions relating to the storage, reordering, and forwarding of packets of data. Often, the packets of data are stored in a random access memory (RAM) that is divided into a plurality of different buffers. To support the different processing needs of the data processing system, packets of data are read out from the buffers in a different order or sequence than the order in which the packets of data were initially written to the buffers.

In illustration, a data processing system may require that packets be classified into several different categories. Within each category, packets may need to be processed in chronological order. To accomplish this sort of processing, a priority-based system, or subsystem, that is capable of tracking buffers is needed. Typically, such a system is implemented using a plurality of parallel data structures of arrays of registers. The registers are used to store a status for each buffer as well as metadata pertaining to the contents of each respective buffer.

Figure 1:
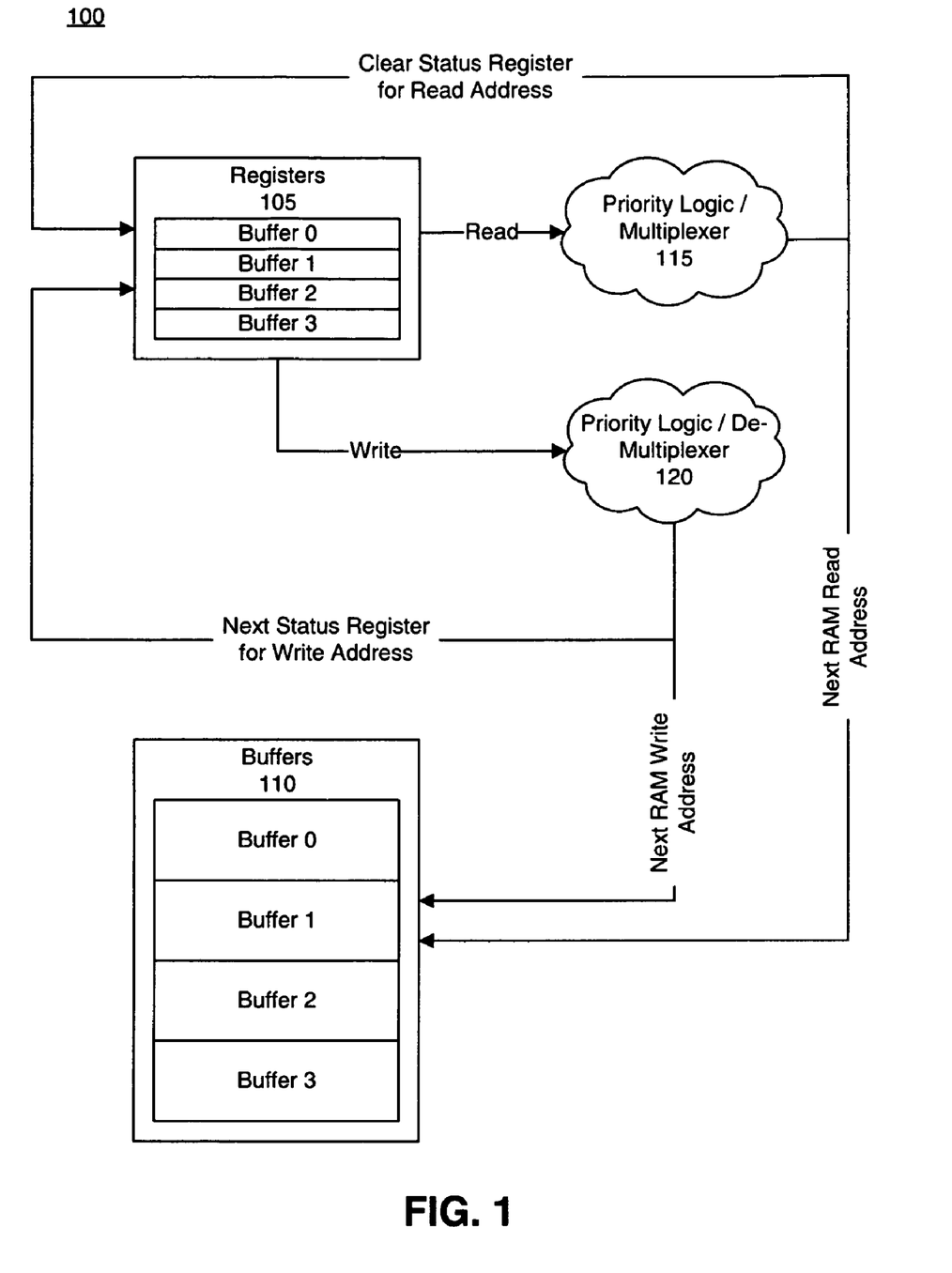
FIG. 1 is a schematic diagram illustrating a conventional buffer management system that supports non-sequential access to buffers.

FIG. 1 is a schematic diagram illustrating a conventional buffer management system 100 that supports non-sequential access to buffers. As shown, buffer management system 100 can include a set of registers 105 and a set of buffers 110. The buffers 110 typically are implemented within RAM. Unlike the buffers 110, each of the registers 105 is implemented using dedicated hardware, not in RAM. The buffer management system 100 facilitates non-sequential access to individual ones of the buffers 110 through the use of registers 105 as well as register-based priority encoding logic depicted as priority logic 115 and 120. The priority logic 115 and 120, as indicated in FIG. 1, further includes a multiplexer and a de-multiplexer respectively.

The registers 105, in combination with the priority logic 115 and 120, track which buffers 110 are available for writing and determine the order in which data is read from the buffers based upon constraints of the particular application with which the buffer management system 100 is used. To select the next buffer to be sequenced, or used, it is necessary to perform logical operations on the entire contents of all of the registers 105. Once a selection is made, additional logical operations must be performed to multiplex the metadata stored within the registers so that the buffer and the metadata associated with that buffer remain associated as each is moved along a data path of a circuit.

It should be appreciated that a system as described with reference to FIG. 1 can include a large number of buffers, with each having a corresponding register for tracking purposes. Buffer management systems of this variety are implemented as large structures of combinatorial logic. Such systems require significant resources within a programmable logic device, i.e. a field programmable gate array, to properly sequence the buffers. Further, conventional buffer management systems tend to be slow in terms of performance due to the significant number of calculations that must be performed, i.e. multiplexing the metadata and performing logic operations across the contents of all registers.

In consequence, buffer management systems of the variety described with reference to FIG. 1 do not operate at the speeds necessary for passing high-bandwidth data. These systems are not considered to be flexible in terms of the number of buffers that are supported since increasing the number of buffers requires rewriting the control logic. Increasing the number of buffers also results in an even wider control path as measured in terms of the number of parallel buffers used. This in turn requires a greater number of logic levels, further decreasing the speed at which the design may operate.

It would be beneficial to implement a buffer management system that overcomes the limitations described above.

SUMMARY

The present invention provides a method, system, and article of manufacture relating to a buffer management system. One embodiment of the present invention can include a buffer management system for use with a data processing system. The buffer management system can include a plurality of tokens, wherein each token is associated with one of the buffers, and a plurality of first-in-first-out (FIFO) memories. Each of the FIFO memories can be associated with a stage of a data processing pipeline and can be configured to store one or more of the tokens. The system further can include control logic configured to determine a state for one or more selected buffers and transfer a token associated with the selected buffer from a source FIFO memory to a target FIFO memory. The target FIFO memory can be selected according to the state of the selected buffer.

The control logic further can select the target FIFO memory from the plurality of FIFO memories according, at least in part, to a data type specified by the token associated with the selected buffer. Each token can specify an address of an associated buffer and further can specify metadata describing content of the associated buffer.

In one embodiment, one or more selected stages of the data processing pipeline can include a plurality of FIFO memories arranged in parallel, with each being reserved for tokens indicating a buffer having content of a particular data type. The control logic can transfer one of the tokens to a target FIFO memory selected from the plurality of FIFO memories arranged in parallel according to metadata specified by the token being transferred. The metadata can indicate the data type. The control logic can be configured with a width that is determined according to a number of different data types processed by the selected stage.

The buffers can be ordered for usage within the data processing system according to an order in which the tokens are stored within at least one of the FIFO memories. Once the buffer management system is initialized, tokens are neither created nor destroyed. The buffer management system further can be implemented on a programmable logic device.

Another embodiment of the present invention can include a method of regulating usage of a plurality of buffers within a data processing system. The method can include associating a token with each buffer, determining a state for each buffer, and transferring tokens to different FIFO memories along a data processing pipeline according to the state of the buffer corresponding to each token. The method further can include sequencing buffers for usage within the data processing system according to an order in which the tokens are stored in the FIFO memories. The sequencing step can include reading a token from a selected FIFO memory and choosing the buffer associated with the token read from the selected FIFO memory as a next buffer to be accessed within the data processing system.

In one embodiment, the data processing system can include a plurality of stages where each stage is associated with one or more FIFO memories. In that case, the method can include indicating that a buffer is available for use within a selected stage by transferring a token associated with the available buffer to a FIFO memory associated with the selected stage.

Each token further can specify metadata that indicates a type of data stored within the buffer represented by that token. The sequencing step further can include transferring a token from a source FIFO memory to a target FIFO memory selected according to the metadata specified by the token. The target FIFO memory can be one of a plurality of parallel FIFO memories for a selected stage, where each of the FIFO memories for the selected stage is associated with a particular type of data. Each FIFO memory also can be reserved for tokens that represent buffers that are available for a specified use as determined from the state of each buffer.

Yet another embodiment of the present invention can include a machine readable storage, having stored thereon a computer program having a plurality of code sections for causing a machine to perform the various steps and/or implement the components and/or structures disclosed herein.

BRIEF DESCRIPTION OF THE DRAWINGS

There are shown in the drawings, embodiments which are presently preferred, it being understood; however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The present invention provides a solution for handling buffer management in a data processing system. The embodiments disclosed herein provide a buffer management system that supports non-sequential access to the buffers and further requires fewer resources than presently available buffer management systems. Rather than relying upon a set of registers and performing register wide logic operations, the embodiments disclosed herein utilize one or more first-in-first-out (FIFO) memories for determining buffer sequencing, or the order in which buffers are accessed within the data processing system. Thus, in accordance with the embodiments disclosed herein, a change in the number of buffers in the data processing system requires only a change in the depth of the FIFO memories included in the buffer management system.

Figure 2:
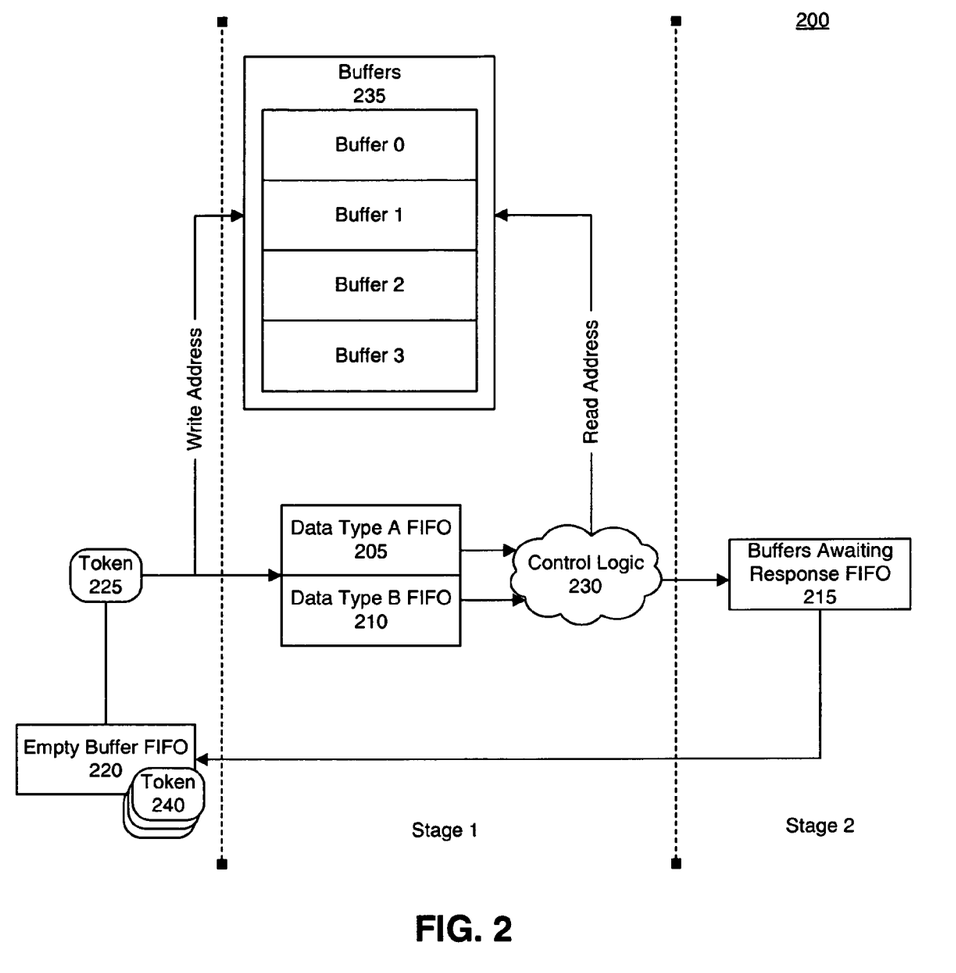
FIG. 2 is a schematic diagram illustrating a buffer management system in accordance with one embodiment of the present invention.

FIG. 2 is a schematic diagram illustrating a buffer management system 200 in accordance with one embodiment of the present invention. As shown, system 200 includes FIFO memories 205, 210, 215, and 220, and control logic 230, which can sequence buffers 235. The FIFO memories 205-220 effectively replace the registers found within conventional buffer management systems. Use of FIFO memories effectively narrows the decision making logic and multiplexing needed, thereby increasing the speed at which the buffer management system 200 can operate.

Each of the FIFO memories 205-220 is configured to store tokens, such as tokens 240 and 225. The tokens 240 and 225 are software constructs that represent the buffers 235. As such, each token is associated with one of the buffers 235. Each token can specify an address of the buffer with which that token is associated. Further, each token can specify metadata. The metadata stored within a token describes various attributes of the data, i.e. contents, stored within the buffer to which the token is associated. In accordance with the embodiments disclosed herein, sequencing of buffers 235 for use within the data processing system is accomplished by moving tokens from one FIFO memory to another. In general, tokens are moved among FIFO memories based upon the state of the buffer represented by each token, i.e. empty, indicates current read address, and the like.

Each stage of a data processing pipeline within the data processing system, for example stages 1 and 2, can include one or more FIFO memories. If sequencing, or reordering, is to be performed, a plurality of FIFO memories arranged in parallel can be used for sequencing buffers within that stage. In illustration, data type A FIFO memory 205 and data type B FIFO memory 210 are arranged in parallel and correspond to stage 1. FIFO memory 205 is reserved for tokens having metadata indicating a data type of A, while FIFO memory 210 is reserved for tokens having metadata indicating a data type of B. That is, tokens stored in FIFO memory 205 point to buffers that hold data of type A, as specified by the metadata of the tokens stored therein. Similarly, tokens stored in FIFO memory 210 point to buffers that hold data of type B, as specified by the metadata of the tokens stored therein.

Thus, tokens can be stored in either FIFO memory 205 or FIFO memory 210 based upon the data type indicated by the metadata stored in each respective token. This allows tokens, and therefore, buffers within stage 1 to be reordered. For example, data type A may be treated with a higher priority than data type B. If that is the case, control logic 230 need only check for the presence of data in FIFO memory 205. Tokens stored in FIFO memory 205 can be processed prior to tokens stored in FIFO memory 210. The control logic 230 performs a simple comparison between FIFO memory 205 and FIFO memory 210 by checking a flag indicating the presence of data for each of FIFO memories 205 and 210. Such a configuration allows the control logic 230, also referred to as the decision making logic, to have a width corresponding to the number of data types, and thus FIFO memories, processed in a given stage. This results in narrower control logic 230 than would otherwise be the case in a conventional register-based buffer management system.

Use of FIFO memories 205-220 further provides inherent chronological ordering. Within each respective FIFO memory, those tokens stored earlier in time are read or available prior to those stored later. For example, with respect to FIFO memory 205, the oldest packet of data type A is stored in the buffer address specified by the token available at the output of FIFO memory 205.

As discussed, a FIFO memory for storing tokens can be provided for each stage of a packet processing pipeline within the data processing system. The tokens can flow from one FIFO memory to the next as each stage of the pipeline takes control of a given buffer. At initialization time, the empty buffer FIFO 220 can be loaded with a token for each buffer 235. During operation, tokens are neither created nor destroyed, but instead remain constant with the number of buffers in the data processing system or in a given data processing pipeline as the case may be. With reference to FIG. 2, as buffers are needed, a buffer is selected by obtaining the next token available, i.e. token 225, from the empty buffer FIFO 220. It should be appreciated, however, that the particular number of FIFOs and the organization of such FIFOs within a given stage will depend upon the specific design being implemented. As such, a given stage may or may not have a need for an "empty buffer FIFO" depending upon the design.

In any case, with respect to FIG. 2, the empty buffer FIFO 220 simplifies the write logic needed to access the buffers 235. Within conventional register-based priority systems, determining whether any buffers are empty, or available, requires a wide logical-OR operation to be performed on the status of each buffer 235. This entails performing a logical-OR operation using each register. Further, selecting the next buffer to which data is written requires a priority encoder, or other similar solution, that is capable of selecting between empty buffers. Register-based buffer management systems introduce unnecessary overhead particularly as empty buffers may be viewed as equivalents within a system that reorders the buffers arbitrarily. By comparison, the embodiments of the present invention need only check the output of the appropriate FIFO memory, in this case FIFO memory 220, to determine or identify the next empty buffer.

In one embodiment of the present invention, system 200 can be implemented using a PLD such as a field programmable gate array (FPGA). If an FPGA from Xilinx, Inc. of San Jose, Calif. is used, for example, the implementation of system 200 can be significantly smaller than that of a register-based buffer management system. Specifically, if an FPGA having an SRL-16 primitive is selected, the SRL-16 primitive can be used to implement a 16-bit deep synchronous FIFO, thereby serving as a FIFO memory as described herein. This structure can be implemented in the same space that normally is required to implement a single bit register. It should be appreciated that SRL-16 primitives also can be cascaded in width or depth to form a FIFO that is larger than 16 bits in depth and 1 bit in width as may be needed for a particular application.

Figure 3:
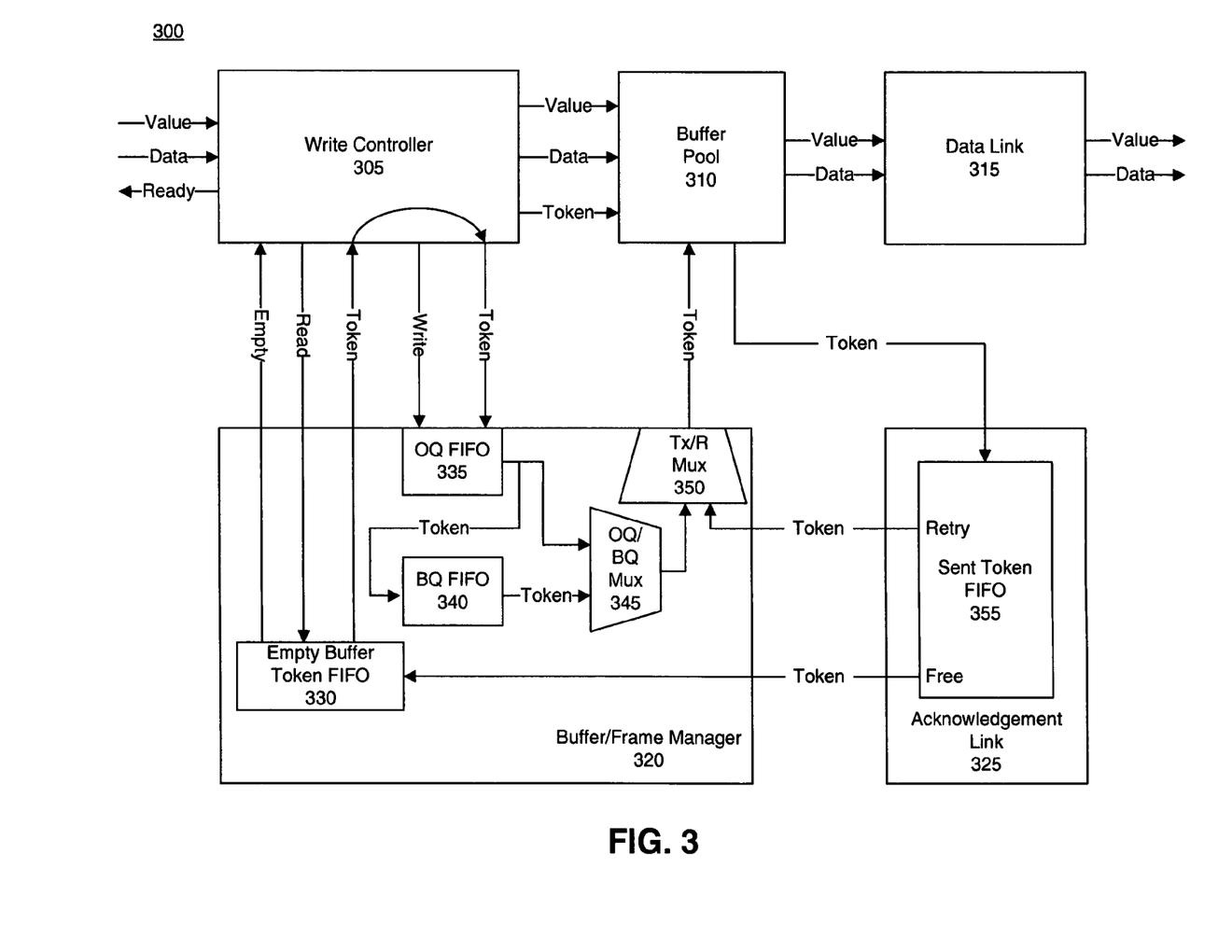
FIG. 3 is a schematic diagram illustrating a buffer management system in accordance with another embodiment of the present invention.

FIG. 3 is a schematic diagram illustrating a buffer management system 300 in accordance with another embodiment of the present invention. Buffer management system 300 provides a more detailed illustration of a system configured in accordance with the embodiments described herein. As shown, buffer management system 300 includes a write controller 305, a buffer pool 310, and a data link 315. System 300 also can include a buffer/frame manager 320 and an acknowledgement link 325 having a sent token FIFO 355 disposed therein. The buffer/frame manager 320 includes an empty buffer token FIFO 330, an ordered queue token FIFO (OQ FIFO) 335, a bypass queue token FIFO (BQ FIFO) 340, an OQ/BQ multiplexer (OQ/BQ Mux) 345, and a transmission/retry multiplexer (Tx/R Mux) 350.

While various components and functions of system 300 may correspond to components and functions described with reference to FIG. 2, it should be appreciated that there need not be a one-to-one correspondence. Such is the case particularly as each system disclosed herein is presented as an example of a possible, specific implementation of a buffer management system. Thus, in general, the buffer pool 310 corresponds to the buffers 235 of FIG. 2 and the empty buffer token FIFO 330 corresponds to the empty buffer FIFO 220. Similarly, the OQ FIFO 335 corresponds to the data type A FIFO 205 and the BO FIFO 340 to the data type B FIFO 210. The OQ/BQ Mux 345 and the Tx/R Mux 350, taken collectively, comprise the control logic 230 and the sent token FIFO 355 corresponds to the buffers awaiting response FIFO 215.

In operation, tokens originate in the empty buffer token FIFO 330. When new data is to be written to the system and there are empty buffers, the write controller 305 removes a token from the empty buffer token FIFO 330. Empty buffers are available for use when the empty buffer token FIFO 330 is not empty. The write controller 305 further writes the incoming data to the buffer represented by the removed token. The write controller 305 then writes that token to the OQ FIFO 335. The token can specify the number of the buffer that is used, i.e., a write address or the like.

As noted, the embodiment illustrated in FIG. 3 can differ from that of FIG. 2 in a variety of ways. In terms of data flow, for example, tokens are first written to the OQ FIFO 335 within system 300. Selected tokens, however, can be shunted to the BQ FIFO 340. The term "shunting", as used herein, refers to taking a token from the output of the OQ FIFO 335 and inserting the token into the BQ FIFO 340 rather than routing it through the OQ/BQ Mux 345. This technique of shunting selected tokens allows reordering of the buffers represented by the tokens. While the OQ FIFO 335 and the BQ FIFO 340 are arranged in series since the input to the BQ FIFO 340 is provided by the output of the OQ FIFO 335, the two exhibit parallel behavior since the outputs of both FIFOS are fed to the OQ/BQ Mux 345 or control logic.

With regard to functionality, system 300 allows data stored in the buffers that is subsequently transmitted across a link to be either acknowledged or not-acknowledged by the link partner or data recipient. In the event that the data is acknowledged, the buffer is freed and the token is transferred from the sent token FIFO 355 to the empty buffer token FIFO 330. If, however, data is not-acknowledged, the token is passed back via the Tx/R Mux 350 thereby causing the data to be retransmitted and the token to reenter the sent token FIFO 355.

Figure 4:
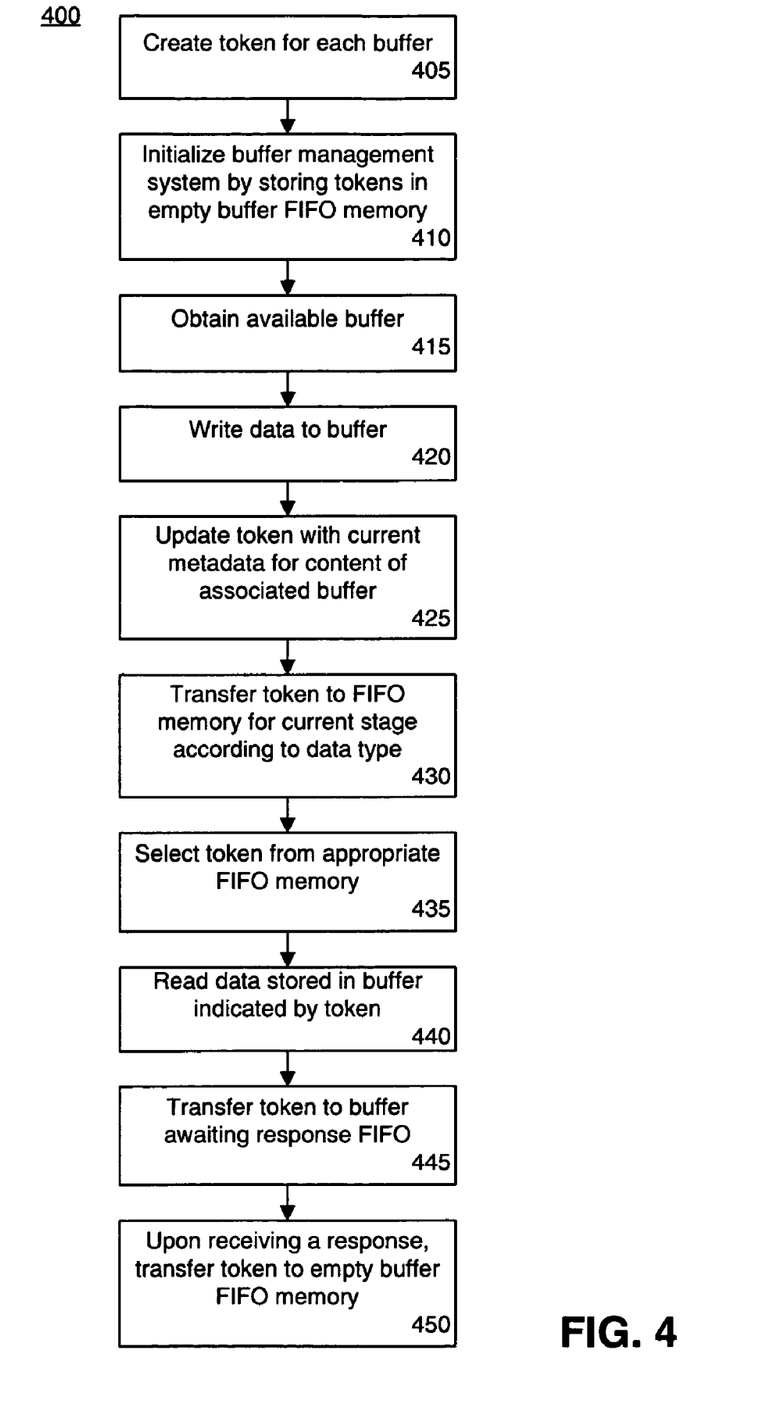
FIG. 4 is a flow chart illustrating a method of tracking and/or managing buffers within a data processing system in accordance with another embodiment of the present invention.

FIG. 4 is a flow chart illustrating a method 400 of tracking and/or managing buffers within a data processing system in accordance with another embodiment of the present invention. Method 400 can be performed by a buffer management system such as either of the systems described with reference to FIG. 2 and/or FIG. 3. Accordingly, method 400 can begin in step 405 where one token for each buffer within a data processing pipeline and/or system can be created. As noted, each token is associated with one buffer and each token specifies the address of, or a reference to, the buffer with which that token is associated.

In step 410, the buffer management system can be initialized in that each token that was created can be stored in a FIFO memory reserved for tokens that represent available, or empty, buffers. As used herein, an available, or empty, buffer refers to a buffer that is available for storing new data. As such, the buffer need not be empty, but may be overwritten as the data contained therein is no longer useful or timely.

In step 415, the control logic can obtain an available buffer. More particularly, the control logic can read the next token from the "empty buffer FIFO memory". The buffer indicated by that token is available to store data. In step 420, the control logic can write data to the buffer indicated by the token obtained in step 415. Accordingly, in step 425, the token can be updated with metadata that describes the data that was stored in the buffer in step 420. That is, the metadata is written to the token. The metadata can specify one or more attributes of the data, including, but not limited to, a type of the data that was written to the buffer.

In step 430, the token is transferred to a FIFO memory for the current stage of the pipeline. As noted, each stage of the pipeline can include one or more FIFO memories. Thus, in the case where two or more FIFO memories are arranged in parallel, each can be reserved for tokens representing buffers having a particular type of data stored therein. Accordingly, the token can be transferred to an appropriate FIFO memory of the set of parallel FIFO memories according to the type of data specified by the metadata included in that token. As illustrated with reference to FIG. 2, if the metadata of the token specifies type A data, the control logic can store the token in the "data type A FIFO memory". If the metadata of the token specifies type B data, the control logic can store the token in the "data type B FIFO memory".

In step 435, the control logic can select a token for processing from the appropriate FIFO memory of the processing stage. More particularly, in the case where the stage has a plurality of FIFO memories arranged in parallel, it may be the case that each is reserved for a particular data type as discussed. If so, one data type, for example data type A, may be of higher priority than data type B. Selecting a token from one of a plurality of parallel FIFO memories facilitates reordering of packets and can be performed through a simple comparison of the flags for each parallel FIFO memory. Accordingly, the flag for "data type A FIFO memory" can be compared with the flag for "data type B FIFO memory". If both have data, tokens from "data type A FIFO memory" can be selected until none remain. At that point, if "data type B FIFO memory" has data, tokens from that FIFO memory can be selected until none remain or until more data is found within the "data type A FIFO memory".

In step 440, data stored in the buffer indicated by the token obtained in step 435 can be read. In step 445, the token can be transferred to a FIFO memory for the next stage of the data processing pipeline. This FIFO memory can be reserved for tokens of buffers that are awaiting a response. In illustration, once the data from the buffer is read, that data can be transmitted. The token representing the buffer from which the data was read can be placed in an "awaiting response FIFO memory" until such time that a response is obtained indicating that the data was received by the recipient. Once such notice is obtained, in step 450, the token can be moved or transferred to the "empty buffer FIFO memory".

The embodiments described herein have been provided for purposes of illustration only and, as such, are not intended to limit the present invention in any way. It should be appreciated that the structure of the buffer management system described herein can be varied according to the architecture of the particular data processing system and/or pipeline with which the buffer management system is used. Further, as noted, the different types of data, and thus FIFO memories in a given stage, whether arranged in parallel or not, are driven by the architecture of the information processing pipeline and/or data processing system.

The embodiments described herein provide a flexible and efficient buffer management system. In contrast to conventional buffer management systems, the embodiments described herein are easily scalable in that when FIFO memories are added, the control logic changes little. Further, the embodiments described herein, as noted, require much less space than conventional buffer management systems, thereby saving limited resources and routing resources when implemented within a PLD.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

We claim:

1. A buffer management system for use with a data processing system comprising:
   a plurality of buffers, wherein each buffer is represented by one token, wherein each said token specifies an address of an associated buffer and further specifies metadata describing a data type of contents of the associated buffer;
   a plurality of first-in-first-out (FIFO) memories, wherein each said FIFO memory is associated with a stage of a data processing pipeline and is configured to store at least one of said tokens indicating that the buffer corresponding to each token stored within the plurality of FIFO memories is not empty, wherein at least one stage of the data processing pipeline comprises at least a first FIFO memory storing tokens corresponding to a first data type and a second FIFO memory storing tokens corresponding to a second data type, wherein a number of the plurality of FIFO memories is dependent upon a number of data types processed by the buffer management system; and control logic configured to determine a state for at least one selected buffer according to said token associated with the selected buffer, wherein said token associated with the selected buffer is obtained from a source FIFO memory and transferred to a target FIFO memory, wherein each FIFO memory is correlated with a buffer state and said target FIFO memory is selected to indicate the state of the selected buffer, and wherein each token is persisted within a FIFO memory, and not destroyed, during operation of the buffer management system.

2. The buffer management system of claim 1, wherein said control logic further selects said target FIFO memory from said plurality of FIFO memories according, at least in part, to a data type specified by said token associated with the selected buffer.

3. The buffer management system of claim 1, wherein at least one selected stage of the data processing pipeline comprises a plurality of FIFO memories arranged in parallel with each being reserved for tokens indicating a buffer that comprises content of a particular data type.

4. The buffer management system of claim 3, wherein said control logic transfers one of said tokens to a target FIFO memory selected from said plurality of FIFO memories arranged in parallel according to metadata specified by said token being transferred, wherein the metadata indicates the data type.

5. The buffer management system of claim 3, wherein said control logic has a width determined according to a number of different data types processed by said selected stage.

6. The buffer management system of claim 1, further comprising at least one additional FIFO memory reserved for storing tokens representing empty buffers.

7. The buffer management system of claim 1, wherein each token comprises metadata describing content of the buffer associated with that token, and wherein the metadata within the tokens is updated according to changing content within the respective buffers as the tokens are persisted during operation of the buffer management system.

8. The buffer management system of claim 1, wherein each of the plurality of FIFO memories is associated with one of a plurality of states attributable to a buffer, wherein storage of a token representing a buffer within a selected one of the plurality of FIFO memories indicates that the buffer represented by that token has taken on the state associated with the selected FIFO memory.

9. The buffer management system of claim 1, further comprising at least one additional FIFO memory reserved for storing tokens representing buffers that are awaiting a response that data read from each buffer represented by a token stored within the at least on additional FIFO memory was received by a recipient.

10. A method of regulating usage of a plurality of buffers within a data processing system comprising:
associating a token with each buffer, wherein each token specifies metadata indicating a type of data stored within the buffer represented by that token, wherein each of a plurality of first-in-first-out (FIFO) memories stores tokens corresponding to data stored with the buffer of a particular type;

obtaining a next token from a source FIFO memory selected from the plurality of FIFO memories;

selecting the buffer associated with the next token;

transferring the next token to a target FIFO memory along a data processing pipeline according to the state of the buffer corresponding to the next token, wherein the target FIFO memory is selected according to the metadata specified by the token;

sequencing buffers for usage within the data processing system according to an order in which the tokens are stored in the FIFO memories; and persisting each token once created during operation of a system regulating usage of the plurality of buffers, wherein a number of the plurality of FIFO memories is dependent upon a number of data types processed by the data processing system.

11. The method of claim 10, said sequencing step further comprising:
reading a token from a selected FIFO memory; and
choosing the buffer associated with the token read from the selected FIFO memory as a next buffer to be accessed within the data processing system.

12. The method of claim 10, wherein the data processing system comprises a plurality of stages and each stage is associated with at least one FIFO memory, said method further comprising indicating that a buffer is available for use within a selected stage by transferring a token associated with the available buffer to a FIFO memory associated with the selected stage.

13. The method of claim 10, wherein the target FIFO memory is one of a plurality of parallel FIFO memories for a selected stage, wherein each of the FIFO memories for the selected stage is associated with a particular type of data.

14. The method of claim 10, wherein each of the plurality of FIFO memories is associated with one of a plurality of states attributable to the plurality of buffers, the method further comprising determining a state of a selected buffer according to the state associated with the FIFO memory storing the token representing the selected buffer.

15. The method of claim 10, further comprising reserving at least one additional FIFO memory for storing tokens representing buffers that are awaiting a response that data read from each buffer represented by a token stored within the at least one additional FIFO memory was received by a recipient.

16. A machine readable storage, having stored thereon a computer program having a plurality of code sections for implementing a buffer management system within a programmable logic device, said machine readable storage comprising:
code for implementing a plurality of buffers, wherein each buffer is represented by one token, wherein each said token specifies an address of an associated buffer and further specifies metadata describing a data type of contents of the associated buffer;

code for implementing a plurality of first-in-first-out (FIFO) memories, wherein each FIFO memory is associated with a stage of a data processing pipeline and is configured to store at least one of the plurality of tokens indicating that the buffer corresponding to each token stored within the plurality of FIFO memories is not empty, wherein at least one stage of the data processing pipeline comprises at least a first FIFO memory storing tokens corresponding to a first data type and a second FIFO memory storing tokens of a second data type, wherein a number of the plurality of FIFO memories is dependent upon a number of data types processed by the buffer management system; and code for implementing control logic configured to determine a state for at least one selected buffer according to the token associated with the selected buffer, wherein each FIFO memory is correlated with a buffer state, wherein the token associated with the selected buffer is obtained from a source FIFO memory and transferred to a target FIFO memory that is selected to indicate the state of the selected buffer, and wherein each token is persisted within a FIFO memory, and not destroyed, during operation of the buffer management system.

17. The machine readable storage of claim 16, wherein said code for implementing the control logic further comprises code for selecting the target FIFO memory from the plurality of FIFO memories according, at least in part, to a data type specified by the token associated with the selected buffer.

18. The machine readable storage of claim 16, wherein said code for implementing the FIFO memories further comprises code for implementing, for at least one selected stage of the data processing pipeline, a plurality of FIFO memories arranged in parallel with each being reserved for tokens indicating a buffer that comprises content of a particular data type.

19. The machine readable storage of claim 18, wherein each of the plurality of FIFO memories is associated with one of a plurality of states attributable to a buffer, wherein storage of a token representing a buffer within a selected one of the plurality of FIFO memories indicates that the buffer represented by that token has taken on the state associated with the selected FIFO memory.

20. The machine readable storage of claim 18, wherein said code for implementing the control logic configures the control logic with a width determined according to a number of different data types processed by the selected stage.

* * * * *

UNITED STATES PATENT AND TRADEMARK OFFICE
CERTIFICATE OF CORRECTION

| | | |
|---|---|---|
| PATENT NO. | : 7,668,186 B1 | Page 1 of 1 |
| APPLICATION NO. | : 11/369338 | |
| DATED | : February 23, 2010 | |
| INVENTOR(S) | : Nelson, IV et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Seventh Day of December, 2010

David J. Kappos
*Director of the United States Patent and Trademark Office*